United States Patent [19]
Fassauer

[11] 3,920,224
[45] *Nov. 18, 1975

[54] PARTICULATE MATERIAL FEEDER

[75] Inventor: Arthur L. Fassauer, Canyon, Tex.

[73] Assignee: Fassauer Industries, Inc., Canyon, Tex.

[ * ] Notice: The portion of the term of this patent subsequent to Apr. 2, 1991, has been disclaimed.

[22] Filed: Sept. 14, 1973

[21] Appl. No.: 397,356

Related U.S. Application Data

[63] Continuation-in-part of Ser. No. 275,756, July 27, 1972, Pat. No. 3,800,745.

[52] U.S. Cl. ......... 259/8; 259/44; 119/51.11, 56 R; 222/236
[51] Int. Cl.[2] ..................... A01K 5/02; B01F 15/02
[58] Field of Search ........... 259/7, 8, 42, 43, 44, 45, 259/46, 9, 10; 222/410; 119/51.11, 52 A, 56R; 222/236, 237; 239/142, 668, 669; 259/DIG. 17, 31; 416/211

[56] References Cited
UNITED STATES PATENTS

| | | | |
|---|---|---|---|
| 3,197,084 | 7/1965 | Lely | 222/410 |
| 3,592,444 | 6/1971 | Arvanitakis | 259/44 |
| 3,800,745 | 5/1974 | Fassauer | 259/44 |

FOREIGN PATENTS OR APPLICATIONS

| | | | |
|---|---|---|---|
| 1,095,040 | 12/1960 | Germany | 239/669 |
| 1,089,302 | 11/1967 | United Kingdom | 239/668 |

Primary Examiner—Harvey C. Hornsby
Assistant Examiner—James A. Niegowski
Attorney, Agent, or Firm—Richards, Harris & Medlock

[57] ABSTRACT

A hopper stores a quantity of dry, particulate material and is partially closed at the bottom by a guide plate having downwardly curved sides and a central circular orifice. The orifice extends into an agitator chamber having generally conical wall surfaces and a flat circular floor. The conical walls of the agitator chamber include a discharge opening which leads to a delivery chute. A more driven agitator blade having an upstanding feeder shaft extending into the hopper orifice is rotatably mounted above the floor of the agitator chamber. When the motor is energized rotation of the agitator blade, including the feeder shaft, causes material to flow from the hopper orifice into the path of the agitator blade. The rotating blade fluidizes the particulate material and centrifugally deflects it in a circular path about the chamber walls so that the material flows through the discharge opening down the delivery chute and into a receiving container. In another embodiment the feeder includes an agitator assembly comprising a molded hub and agitator rods extending angularly upwardly and outwardly from the hub. The feeder shaft extends upwardly and somewhat outwardly from the hub to an enlarged molded tip positioned in the lower portion of the hopper above the circular orifice.

9 Claims, 11 Drawing Figures

PARTICULATE MATERIAL FEEDER

CROSS REFERENCE TO RELATED APPLICATION

This application is a continuation-in-part of copending application Ser. No. 275,756 filed 7/27/72 now U.S. Pat. No. 3,800,745 for Animal Feeder.

BACKGROUND OF THE INVENTION

1. Field of the Invention

The invention relates to particulate material feeders, and more particularly, to a feeder for dispensing predetermined quantities of feed particles into a receptacle.

2. History of the Prior Art

A wide variety of different types of devices have been heretofore developed for metering particulate material such as coffee, soap, animal feed and the like into a receptacle. In the past, such metering devices or feeders have been of the type wherein feed is periodically augered from a hopper into a trough or wherein periodic movement of a release gate causes material to drop from a hopper into a receiving receptacle. These types of feeders possess numerous disadvantages in that the feed delivery mechanisms are relatively large and mechanically complex and, consequently, are subject to mechanical malfunction and/or substantial maintenance. Other types of prior art feeders have employed centrifugal force for dispensing material by including rotating pipes and nozzles which project the material onto the ground in a circular pattern about the feeder. Prior art centrifugal feeders also exhibit certain disadvantages, such as a failure to distribute material into a single, localized area as required for such applications as domestic food use, pet feeding and veterinarial institutions and the like. The present feeders overcomes many of the disadvantages of prior art feeders and provides a compact dispensing structure which has few moving parts and accurately dispenses a predetermined quality of particulate material.

SUMMARY OF THE INVENTION

The invention relates to particulate material feeders, and more particularly, to a feeder for dispensing metered quantities of particles into a bowl. In accordance with one aspect of the invention an annular, fluidized, circumferentially moving layer of particulate material is generated in an agitation zone. The material is directed from the layer out of the agitation zone at a predetermined rate and additional material is admitted to the agitation zone at the same predetermined rate.

In accordance with another aspect of the invention an upwardly and outwardly tapered conical wall defines an agitation chamber. Outlet means are formed through the conical wall and extend to a receptacle. An agitator blade is supported in the bottom of the agitation chamber for rotation about the axis of the conical wall and the blade includes surfaces extending angularly relative to the axis of the conical wall. Means are included for rotating the agitation blade in the agitation chamber at a predetermined rate and thereby forming an annular, fluidized layer of particulate material on the wall which travels circumferentially around the wall for discharge through the outlet means into the receptacle. A hopper is mounted above the agitation chamber for receiving a supply of particulate and means are mounted between the hopper and the agitation zone for directing material from the hopper into the agitation zone at the same rate that material is discharged from the agitation zone through the outlet means.

In accordance with another embodiment of the invention, the feeder is provided with an agitation assembly comprising a molded hub supported on an upwardly extending drive shaft. A pair of agitator rods extend angularly upwardly and outwardly from the hub for rotation therewith to effect fluidization of the particulate material. A feeder shaft extends upwardly and somewhat outwardly from the hub into the hopper and functions to assure flow of particulate material out of the hopper and into the agitation zone.

BRIEF DESCRIPTION OF THE DRAWINGS

A more complete understanding of the invention may be had by reference to the following Detailed Description taken in conjunction with the accompanying Drawings in which.

DETAILED DESCRIPTION

Figure 1:
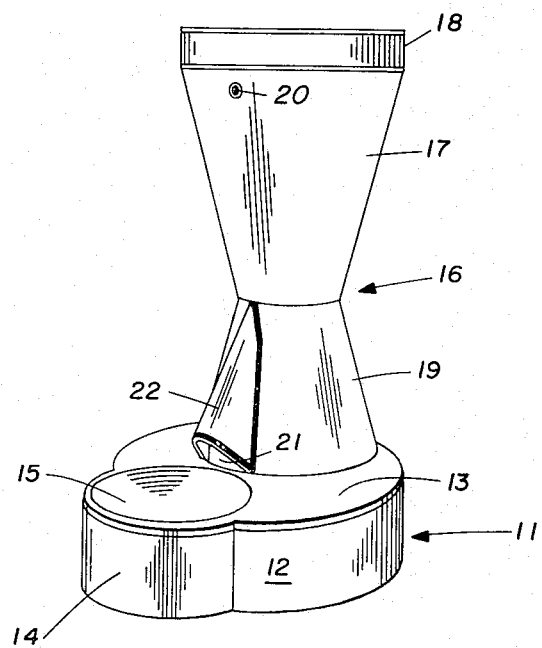
FIG. 1 is a perspective view of the exterior of a feeder incorporating the present invention.

Referring to FIG. 1, there is shown a perspective view of the outer housing of an animal feeder incorporating a first embodiment of the present invention. While the present invention is applicable for use in feeders for metering a wide variety of particulate materials such as coffee and other food products, the preferred embodiment will be described relative to an animal feeder for clarity of illustration. The housing includes a base 11 having vertically oriented cylindrical walls 12 and a flat top portion 13. The base 11 includes a cylindrical projection 14 which houses an eating bowl 15. The eating bowl 15 may be formed integrally with the base as shown, or may be removable or include a removable liner for apparent sanitary reasons. Mounted on the top portion 13 of the base 11 is an upstanding hopper and feeder module 16 including a conical hopper section 17 having upwardly and outwardly extending walls and which is closed at the top by a removable cylindrical cover 18. Between the hopper section 17 and the base portion 11 there is a feed distribution section 19 having downwardly and outwardly extending walls. A feed distribution opening 20 is formed in the distribution section 19 and is partially enclosed by a cover member 21.

A feed distribution push switch 20 is mounted on the side of the hopper section 17.

Figure 2:
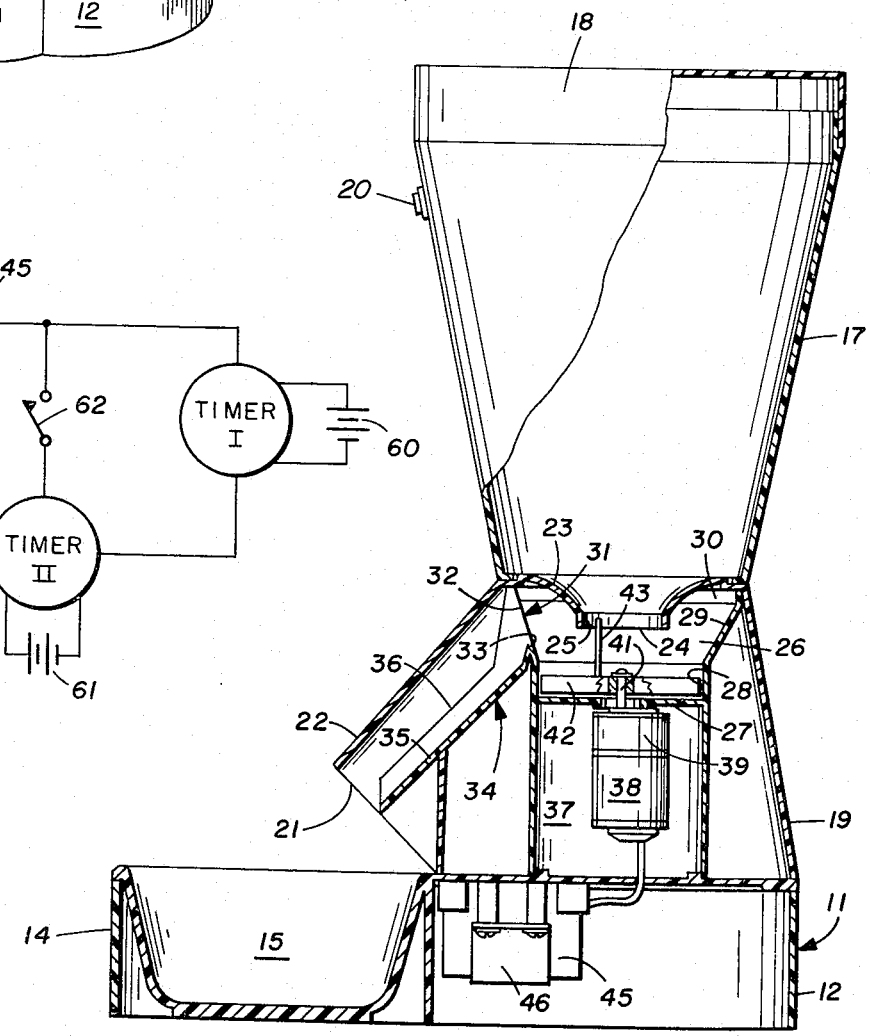
FIG. 2 is a side cross section view of a feeder comprising a first embodiment of the invention.
Figure 3:
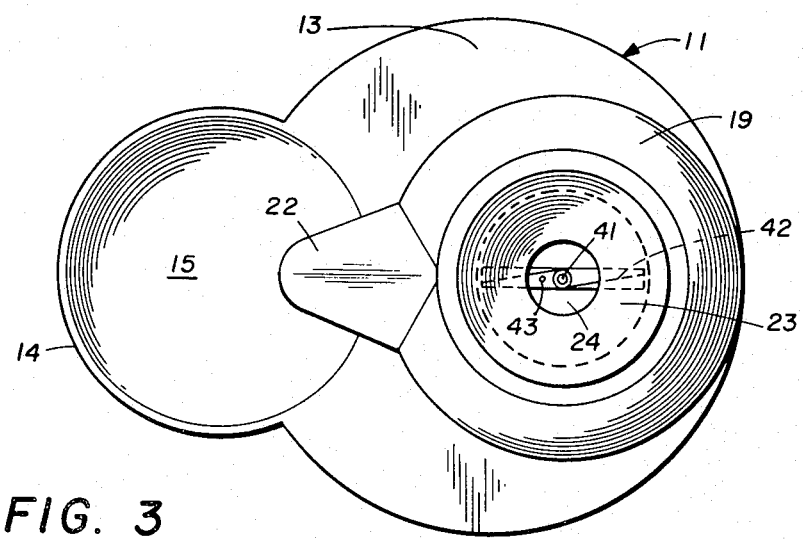
FIG. 3 is a top view of the feeder shown in FIG. 2 with the hopper removed showing the feed guide plate, agitator chamber and agitator blade structure.

Referring now to FIG. 2, there is shown a side cross section view of the animal feeder shown in FIG. 1. The cover 18 is preferably attached to the hopper section 17 by a close sliding fit. Alternatively, mating screw threads may be provided on the two surfaces. The cover 18 is removable in order to permit the hopper to be filled with animal feed preferably in a granular or pelletized form, but also in any other dry, particulate form as may be desirable in particular instances.

The walls of the hopper section 17 extend downwardly and are closed at the bottom by a feed guide plate 23. The guide plate 23 has wall surfaces which are generally hyperbolic in cross section and extend inwardly and downwardly to form a hopper orifice 24. The orifice 24 is defined by a cylindrical ring section 25 connected to the downwardly extending walls of the feed guide plate 23.

Located below the orifice 24 is an agitator chamber 26 which is closed at the bottom by a flat circular floor 27. The sides of the chamber 26 are formed by cylindrical walls 28 which extend upwardly from the floor 27 and which are connected to upwardly and outwardly flaring conical walls 29. The conical walls 29 are joined to a short cylindrical ring section 30 which abuts the bottom of the hopper 17. The agitator chamber 26 is partially enclosed at the top by the bottom surface of the feed guide plate 23.

Figure 4:
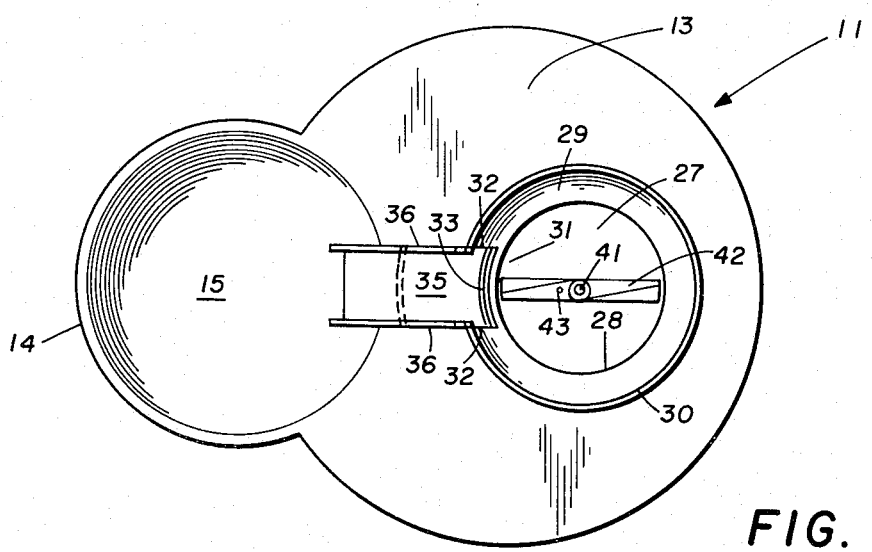
FIG. 4 is a top view of the feeder shown in FIG. 2 with both the hopper and the feed guide plate and the chute cover removed showing the agitator chamber and agitator blade structure.

The conical walls 29 of the agitator chamber 26 are interrupted by a discharge opening 31 as is best shown in FIGS. 2 and 4. The discharge opening 31 is defined by a pair of opposed parallel side edges 32 and a horizontal bottom edge 33. The bottom edge 33 is located slightly above the juncture of the cylindrical walls 28 and the conical walls 29.

The discharge opening 31 leads into a feed delivery chute 34 having a flat inclined bottom 35, and parallel, vertically extending sides 36. The sides 36 fit within the inner walls of the cover member 22 which encloses the chute.

A motor chamber 37 is located beneath the agitator chamber 26. An electric motor 38 connected through a speed reducer 39 is mounted within the chamber 37. The output shaft 41 of the speed reducer 39 extends up into the agitator chamber 26 through an opening in the center of the floor 27. An agitator blade 42 is fixed to the end of the output shaft 41 above the surface of the circular floor 27. An upstanding feeder shaft 43 is mounted to the blade 42, spaced from the shaft 41, and extending up into the hopper orifice 24. Upon energization of the motor 38, the blade 42 rotates within the cylindrical walls 28 of the agitator chamber 26 and the feeder shaft 43 moves in a circular path within the hopper orifice 24.

The motor 38 is powered by current from a battery 45 which is mounted to the underside of the base 11 by a clamp assembly 46. The motor and battery are interconnected with the actuation switch 23 via leads (not shown) which lie within a channel in the walls of the hopper 17.

Figure 6:
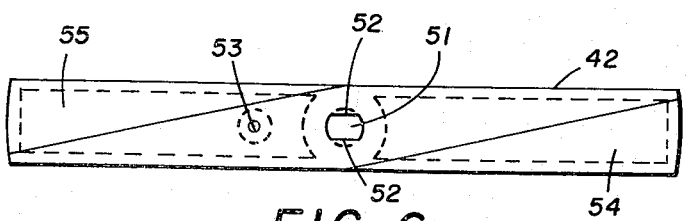
FIG. 6 is a top view of the agitator blade of FIG. 5.
Figure 5:
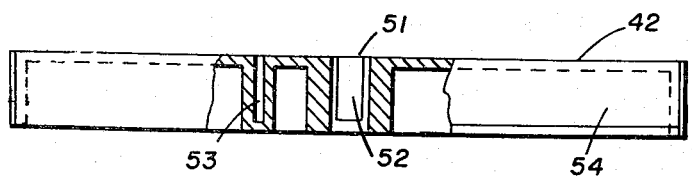
FIG. 5 is a partially cutaway side view of the agitator blade used in the first embodiment of the invention.
Figure 7:
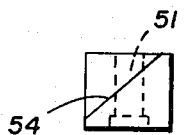
FIG. 7 is an end view of the agitator blade of FIG. 5.

As shown in FIGS. 5 and 6, the agitator blade 42 includes a central opening 51 having a pair of opposed flat shoulder portions 52 which lock the blade to mating surfaces on the output shaft 41 (FIG. 2). The blade 42 also includes a socket 53 which extends parallel to and spaced from the opening 51. The socket 53 receives the lower end of the feeder shaft 43. As shown best in FIG. 7, the blade 42 includes a pair of beveled surfaces 54 and 55.

Before operation, the feeder of the invention is filled by removing the cover 18 from the hopper 17 and placing a supply of dry, particulate feed therein. The feed guide plate 23 prevents feed in the hopper from flooding into and choking the agitator chamber 26. Instead, a limited amount of feed passes through the hopper orifice 24 until the flow is restricted by either material lying at the angle of repose beneath the orifice 24 or by bridging within the orifice 24.

When the distribution switch 20 is pressed, the motor 38 is energized to rotate the output shaft 41 and the agitator blade 42. When the agitator blade 42 is rotating, movement of the feeder shaft 43 in a circular path within the orifice 24 breaks any bridges which may have developed and causes the feed to flow down into the agitator chamber 26 into the path of the agitator blade 42. The surfaces 54 and 55 of the agitator blade 42 strike the feed particles and move them in a pattern up onto and about the conical walls 29, in the direction of rotation of the blade 42. The centrifugal and agitating motion imparted to the feed particles in the chamber 26 produces an expansion and fluidization of the mass into an annular moving layer of material disposed about the conical chamber walls 29. When the individual particles in the fluidized mass moving centrifugally about the walls 29 reach the discharge opening 31, they move outwardly between the edges 32 and down the feed delivery chute 34. The appearance of the feed within the agitator chamber as it is being dispensed is that of an annular fluidized mass of particles thinly covering the conical wall surfaces 29 and moving in a circumferential pattern about the walls with a portion of the mass flowing smoothly out of the agitation zone and through the discharge opening 31. As the dispensed feed moves out of the agitator chamber 26, more feed passes into the chamber through the orifice 24 due to the action of feeder shaft 43.

A very important feature of the invention comprises the cooperation between the hopper section 17, the feed guide plate 23 and extending to the orifice 24, and the agitator chamber 26. During the operation of the animal feeder, additional animal feed is admitted through the orifice 24 at exactly the same rate that animal feed is discharged through the opening 31. By this means the quantity of animal feed within the chamber 26 is maintained constant throughout the operation of the device.

One feature of the operation of the present invention is that for a particular size and weight of feed particles the mass of feed delivered is linearly related to the time interval of actuation. That is, the cooperation of the parts of the feeder including the manner in which the feed is fluidized with particles being distributed in an annular layer about the conical walls of the agitator chamber is such that for each second of energization a metered quantity of feed is dispensed. By controlling the time period during which the switch 20 is closed the dispensed quantity of feed may be controlled to a high degree of accuracy.

The animal feeder of the present invention, in addition to being adapted for actuation by the momentary press switch 20, can also be automatically operated at preselected times to run for a preselected dispensing interval. As pointed out above, actuation of the unit for a given period of time results in dispensing a metered quantity of feed into the bowl 15. This feature is particularly important for veterinarial institutions and laboratories in that it ensures that the animals being fed receive rigorously controlled diets with a preselected quantity of feed being dispensed at preselected hours of the day. Also, this feature enables a pet owner to leave the animal alone for several days with the assurance that it will be regularly fed.

Figure 8:
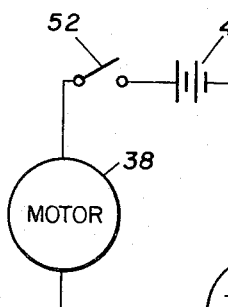
FIG. 8 is a block diagram of an automatic distribution timing circuit used in one embodiment of the invention.

As shown in FIG. 8, an alternate embodiment of the invention involves timing circuitry whereby the feeder is automatically actuated at predetermined times during the day, under control of Timer I. Each actuation is for only a preselected period of time, under control of Timer II, in order to measure out a desired quantity of feed. Both Timer I and Timer II may be mechanically operated or be powered by batteries 60 and 61, as shown. As illustrated in FIG. 8, one terminal of the battery 45 is connected through an on-off switch 52 to the motor 38. The other terminal of the battery 45 is connected to Timer I. Timer I is adapted to momentarily energize Timer II which then locks itself to the battery terminal, via contacts 62, and remains energized for a preselected period of time. While Timer II is operated, power supplied is from the battery 45, through contacts 62 and Timer II to energize the motor 38 and distribute feed into the bowl 15 (FIG. 2). Once Timer II has finished its timing cycle, the circuit, including contacts 62, is again opened and is ready for re-energization by Timer I at the next feeding time.

It is to be understood that the operative portion of the animal feeder of the present invention can be placed in other housings more adapted for the feeding of larger animals such as horses, which might include larger hopper sections and feeding troughs. While it may be necessary to change some of the dimensions of various parts of the feeder, the basic structure and operation remains the same. Further, in each instance where a battery is called for herein it is to be understood that other types of power sources, such as a rectifier power supply, could be used.

By way of specific example of one embodiment of the invention, the hopper 17 was filled with a 35 pound mass of discrete feed particles of "Gaines Meal," each particle having a cylindrical configuration approximately 5/16 inch in diameter. The motor 38 used was a 1/15 horse power 1,750 RPM d.c. motor. The speed of the output shaft 41 was reduced by the speed reducer 39 to a substantially constant speed of about 160 RPM. When the motor was energized the centrifugal and agitating motion imparted to the feed particles in the chamber 26 produced an expansion and fluidization of the mass along the conical chamber walls 29. As the particles moved circularly about the walls 29, they flowed radially through the discharge opening 31 and out the distribution opening 21 into the eating bowl 15. Despite the relatively high speed of the agitator blade 42, the particles were delivered into the bowl 15 without breakage and with an accuracy of ±8 grams in each 250 gram distribution sample over a total delivery of 35 pounds. Considerably larger or smaller size feed particles can be handled by the feeder of the present invention with equal facility by merely changing the dimensions of the parts.

Figures 9, 10, 11:
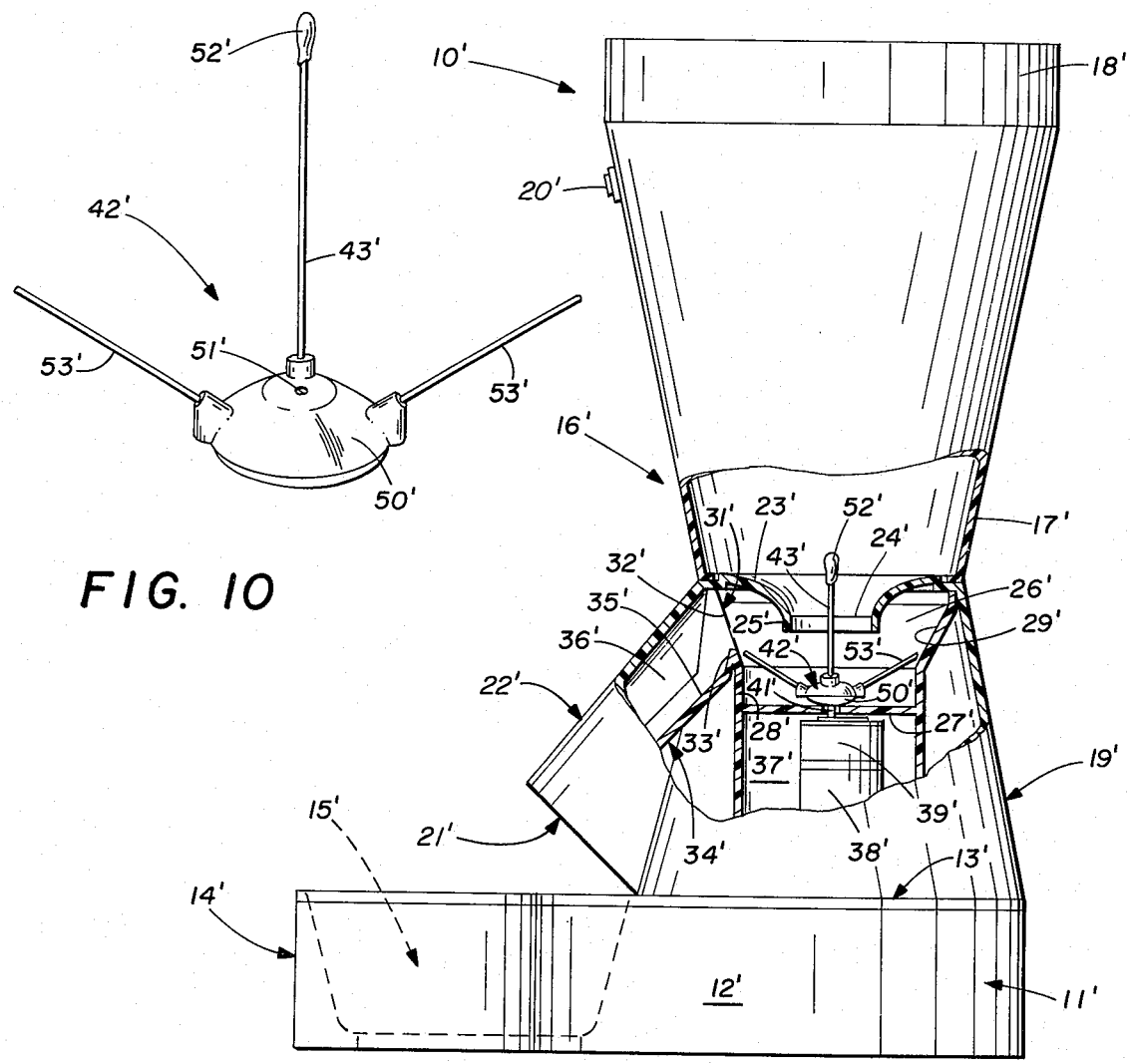
FIG. 9 is a perspective view of an agitator assembly utilized in an alternate embodiment of the invention.
FIG. 10 is a side view of a feeder incorporating the alternative embodiments of the invention in which certain parts have been broken away more clearly to illustrate certain features of the invention.
FIG. 11 is an illustration useful in understanding the operation of feeders incorporating the invention.

Referring now to FIG. 9, there is shown a particulate material feeder 10' incorporating an alternative embodiment of the present invention. The feeder 10' comprises a housing including a base 11' having vertically oriented side walls 12' and a flat top portion 13'. The base 11' includes a cylindrical projection 14' including a spherical particulate material receiving chamber 15'. The chamber 15' may be formed integrally with the base as shown and described hereinbefore in connection with FIG. 2, or may be rendered removable from the remainder of the feeder 10'.

Mounted on the top portion 13' of the base 11' is an upstanding hopper and feeder module 16' including a conical hopper section 17' having upwardly and outwardly extending walls which are closed at the top by a removable cylindrical cover 18'. Between the hopper section 17' and the base portion 11' there is provided a distribution section 19' having downwardly and outwardly extending walls. A distribution opening 21' is formed in the distribution section 19' and is partially enclosed by a cover member 22'. A distribution push switch 20' is mounted on the side of the hopper section 17'.

The cover 18' is preferably attached to the hopper section 17' by a close sliding fit. Mating screw threads may also be provided on the cooperating surfaces of the cover and the hopper sections. The cover 18' is removable in order to facilitate filling of the hopper 17' with any dry, particulate material as may be required by particular circumstances.

The walls of the hopper section 17' extend downwardly and are closed at the bottom by the guide plate 23'. The guide plate 23' has wall surfaces which are generally hyperbolic in cross section and extend inwardly and downwardly to form a hopper orifice 24'. The orifice 24' is defined by a cylindrical ring section 25' connected to the downwardly extending walls of the guide plate 23'.

Located below the orifice 24' is an agitator chamber 26' which is closed at the bottom by a flat circular floor 27'. The sides of the agitator chamber 26' define cylindrical walls 28' which extend upwardly from the floor 27' and which are connected to upwardly and outwardly flaring conical walls 29'. The conical walls 29' are joined to a short cylindrical ring section which abuts the bottom of the hopper 17'. The agitator chamber 26' is partially enclosed at the top by the bottom surface of the guide plate 23'.

The conical walls 29' of the agitator chamber 26' are interrupted by a discharge opening 31'. The opening 31' is defined by a pair of opposed parallel side edges 32' and a horizontal bottom edge 33' which is located slightly above the inner section of the cylindrical wall 28' and the conical wall 29'. The discharge opening 31' leads to a delivery chute 34' having an inclined bottom 35' and parallel, substantially vertically extending sides 36'. The sides 36' fit within the inner walls of the cover member 22' which enclose the chute.

A motor chamber 37' is located beneath the agitator chamber 26'. An electric motor 38' connected through a speed reducer 39' is mounted within the chamber 37'. The speed reducer 39' has output shaft 41' which extends upwardly into the agitator chamber 26' through an opening formed in the center of the floor 27'. An agitator assembly 42' is mounted on the distal end of the output shaft 41' above the surface of the circular floor 27'. The agitator assembly 42' includes a feeder shaft 43' which extends upwardly into the hopper orifice 24'. Therefore, upon energization of the motor 38' the agitator assembly 42' rotates within the cylindrical walls 28' of the agitator chamber 26' and the feeder shaft 43' moves in a circular path within the hopper orifice 24'.

The electric motor 38' is powered by current from a suitable source, such as a battery of the type shown in FIG. 2 or current supplied from a suitable convenience outlet. The current source and the motor 38' are interconnected with the switch 20' by means of suitable electrical connections (not shown) which extend through a channel formed in the walls of the hopper 17'.

As is best shown in FIG. 10, the agitator assembly 42' includes a molded hub 50' having a central opening 51' formed therein which receives the output shaft 41' of the speed reducer 39'. The feeder shaft 43' is molded into the hub 50° and extends upwardly and somewhat outwardly from the hub to a molded tip 52' normally positioned within the hopper 17' above the hopper orifice 24'. The feeder shaft 43' is offset from the opening 51' in the hub 50' by substantially the same amount illustrated in FIG. 5 in connection with the offset of the socket 53 from the aperture 52.

The agitator assembly 42' further comprises a pair of agitator rods 53' which are molded into the hub 50' and which extend angularly upwardly and outwardly therefrom in the manner illustrated in FIGS. 9 and 10. As is best shown in FIG. 9, the agitator rods 53' extend to distal ends positioned substantially in the plane of the bottom edge 33' of the discharge opening 31'. It will thus be understood that upon actuation of the motor 38', the agitator rods 53' are rotated within the chamber 26' thereby fluidizing the particulate material in the chamber and causing flow of the particulate material out of the chamber through the opening 31'.

Prior to operation of the embodiment of the invention illustrated in FIG. 9, the hopper 17' is filled with a supply of particulate material by removing the cover 18' and pouring the particulate material into the hopper. The guide plate 23' prevents the particulate material from flooding into and choking the agitator chamber 26'. Instead, a limited amount of particulate material passes through the orifice 24' until further flow is prevented either by the particulate material line at its angle of repose beneath the orifice 24', or by bridging of the particulate material within the orifice 24'.

When the switch 20' is pressed, the motor 38' is energized to cause rotation of the speed reducer output shaft 41' and the agitator assembly 42'. When the agitator assembly 42' is rotating, movement of the feeder shaft 43' in a circular path within the orifice 24' disrupts any bridging of particulate material which may have developed therein and causes flow of particulate material down into the agitator chamber 26' and into the path of the agitator rods 53' of the agitator assembly 42'. The rods 53' of the agitator assembly 42' engage the particulate material and move it into a pattern on and about the conical walls 29', in the direction of rotation of the agitator assembly 42'. The centrifugal and agitating motion thus imparted to the particulate material in the chamber 26' produces an expansion and fluidization of the mass into a moving layer of particulate material disposed about the conical walls 29'. When the moving layer of particulate material is aligned with the discharge opening 31', particulate material flows outwardly from the agitator chamber 26' through the opening 31' and down into the chamber 15'.

A very important feature of the present invention comprises the cooperation between the hopper 17', the guide plate 23', the orifice 24' and the agitator chamber 26'. Due to the construction of these components, additional particulate material is admitted through the orifice 24' at exactly the same rate at which particulate material is discharged through the opening 31'. By this means the quantity of particulate material within the chamber 26' remains constant throughout the operation of the feeder 10'.

Another important feature of the invention involves the fact that given a particular size and weight of particulate material, the mass of feed delivered is linearly proportional to the time period during which the feeder is operated. That is, the cooperation of the parts of the feeder including the manner in which particulate material is fluidized by the rotating agitator assembly is such that during each time period of operation of the feeder, a precise predetermined quantity of particulate material is dispensed. Therefore, by controlling the time period during which the actuation switch is closed, the quantity of particulate material which is dispensed may be controlled to a high degree of accuracy.

The operation of particulate material feeders incorporating the present invention will be best understood by referring to FIG. 11, wherein the hopper 17' of the feeder 10' is illustrated partially filled with a quantity of particulate material M, but with the agitator assembly 42' not rotating. As is well known, each particulate material has a predetermined angle of repose which is characteristic of that material. Therefore, particulate material M flowing downwardly from the hopper 17' through the orifice 24' and into the agitator chamber 26' will assume a conical configuration having an upper surface extending at the angle of repose A characteristic of that material. Depending on the particular angle of repose A of the particulate material M, the upper surface of the particulate material in the chamber 26' will intersect either the floor 27', or the conical wall 29'.

A critical characteristic of the present invention comprises the relationship of the positioning of the lower edge 33' of the opening 31' to the positioning of the upper surface of the particulate material in the agitation chamber 26', both with respect to the floor 27'. If the edge 33' were to be positioned below the level of particulate material in the chamber 26' lying at its natural angle of repose A, particulate material would continuously flow downwardly out of the chamber 17', through the orifice 24', through the chamber 26', and through the discharge opening 31', into the chamber 15', regardless of whether or not the agitator assembly 42' was rotating. On the other hand, when the edge 33' is positioned above the upper surface of the particulate material in the agitation chamber 26' lying at its natural angle of repose A, particulate material will not flow out of the chamber 26' except under the action of the rotating agitator assembly 42'. Conversely, if the edge 33' is positioned too far above the upper surface of the particulate material in the agitation chamber 26' lying at its natural angle of repose A, the agitator assembly 42' would be unable to fluidize the material sufficiently to cause flow of particulate material out of the chamber 26' through the discharge opening 31'. It will thus be appreciated that there exists a particular relationship of the height of the edge 33' with respect to the floor 27' which must be maintained in order to properly feed a given particulate material in the feeder 10'.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A particulate material feeder comprising:
    an upwardly and outwardly tapered conical wall defining an agitation chamber;
    outlet means formed through the conical wall and extending to a receptacle;
    an agitator assembly supported in the bottom of the agitation chamber for rotation about the axis of the conical wall and comprising agitator rods extending angularly upwardly and outwardly, said outlet means being located above said agitator rods such that the material flows upward and outward said outlet means
    means for rotating the agitator assembly in the agitation chamber at a predetermined rate and thereby forming a fluidized layer of particulate material on the conical wall which travels circumferentially around the conical wall for discharge through the outlet means into the receptacle;
    a hopper mounted above the agitation chamber for receiving a supply of particulate material; and
    means mounted between the hopper and the agitation chamber for directing particulate material from the hopper into the agitation chamber at the same rate that particulate material is discharged from the agitation chamber through the outlet means.

2. The particulate material feeder as set forth in claim 1 wherein said directing means includes:
    a guide plate having a reduced orifice therein for restricting the flow of particulate material from said hopper to said agitation chamber; and
    means extending upward from said agitation chamber into said orifice and adapted for movement within said orifice upon rotation of said agitator assembly for preventing bridging within said orifice and producing a flow of particulate material into said agitation chamber.

3. The particulate material feeder as set forth in claim 2 wherein said means extending into said orifice includes an upwardly and somewhat outwardly extending feeder shaft mounted on the agitator assembly, said shaft being spaced apart from the axis of rotation of the agitator assembly and thereby following a circular path.

4. The particulate material feeder as set forth in claim 1 wherein the rotating means includes an electric motor for agitating an output shaft and a molded hub mounted on the output shaft and supporting the agitator rods and the feeder shaft, wherein the molded hub is positioned below the horizontal plane of the lower edge of the discharge opening.

5. A particulate material feeder comprising:
    an agitation chamber including a substantially flat floor, a cylindrical wall extending upwardly from the floor, and a conical wall tapering upwardly and outwardly from the cylindrical wall;
    means forming an outlet aperture in the conical wall of the agitation chamber;
    hopper means positioned above the agitation chamber for receiving a supply of particulate material;
    guide means defining the bottom of the hopper means and including an orifice for directing particulate material from the hopper means into the agitation chamber under the action of gravity;
    an agitator assembly mounted in the agitation chamber and comprising a molded hub and a pair of agitator rods extending upwardly and outwardly from the hub said hub and rods being positioned below the horizontal plane of the lower edge of said outlet aperture and
    means for rotating the agitator assembly in the bottom of the agitation chamber and thereby establishing a zone of fluidized particulate material traveling around the conical wall of the agitation chamber and flowing out of the agitation chamber through the discharge opening whenever it is aligned therewith.

6. The particulate material feeder according to claim 5 wherein the rotating means further comprises:
    a motor supported beneath the agitation chamber; and
    an output shaft driven by the motor and extending through the floor of the agitation chamber;
    the molded hub of the agitator assembly being supported on the output shaft for rotation therewith.

7. The particulate material feeder according to claim 6 wherein the discharge opening includes a lower edge positioned a predetermined distance above the floor of the agitation chamber, and wherein the agitator rods extend to distal ends positioned in a horizontal plane substantially aligned with the lower edge of the discharge opening.

8. The particulate material feeder according to claim 7 wherein the agitator assembly further includes a feeder shaft mounted on the molded hub and extending therefrom upwardly into the orifice of the guide plate.

9. The particulate material feeder according to claim 8 wherein the feeder shaft extends upwardly and somewhat outwardly from the molded hub to a molded tip positioned within the hopper means above the orifice of the guide plate and wherein the molded hub is supported on said output shaft for rotation therewith and said hub is positioned below the horizontal plane of the lower edge of the discharge opening.

* * * * *